(12) United States Patent
Lever

(10) Patent No.: US 6,405,518 B1
(45) Date of Patent: Jun. 18, 2002

(54) OPTICAL FIBER OVER THE END PAYOFF SYSTEM

(75) Inventor: Clyde Jefferson Lever, Buford, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/748,042

(22) Filed: Nov. 12, 1996

(51) Int. Cl.[7] .................................................. D01H 1/10
(52) U.S. Cl. ....................... 57/1 UN; 57/58.7; 57/58.83; 57/314; 57/352; 242/128; 242/593
(58) Field of Search ............................... 57/1 UN, 58.59, 57/58.7, 58.83, 336, 314, 352; 242/593, 128

(56) References Cited

U.S. PATENT DOCUMENTS

| | | | | |
|---|---|---|---|---|
| 2,921,429 A | * | 1/1960 | Haugwitz | 57/58.7 |
| 3,879,978 A | * | 4/1975 | Harris | 242/128 |
| 4,129,468 A | | 12/1978 | Knab | 156/148 |
| 4,289,558 A | | 9/1981 | Eichenbaum et al. | 156/179 |
| 4,446,686 A | | 5/1984 | Panuska et al. | 57/6 |
| 5,092,117 A | * | 3/1992 | Paivinen et al. | 57/336 |
| 5,311,730 A | * | 5/1994 | Stahlecker | 57/90 |

FOREIGN PATENT DOCUMENTS

| | | | | |
|---|---|---|---|---|
| CA | 458960 | * | 8/1949 | 57/58.83 |
| DE | 3008621 | * | 9/1981 | 242/128 |
| JP | 6-93582 | * | 4/1994 | 57/314 |

* cited by examiner

Primary Examiner—William Stryjewski

(57) ABSTRACT

An optical fiber pay-out system utilizes over-the-end pay-out from a storage spool (34) into a module (38) adjacent the pay-out end of the spool. The module has a freely rotatable capstan (47) affixed thereto over a portion of the surface of which are endless belt (63) is in contact. A nozzle member (42) directs the paid out fiber into the region of belt and surface contact. Height adjusting members (72) are provided for imparting a twist to the fiber in the region by directing the fiber to an off-center position relative to the centerline of contact of the belt and surface of the capstan.

18 Claims, 3 Drawing Sheets

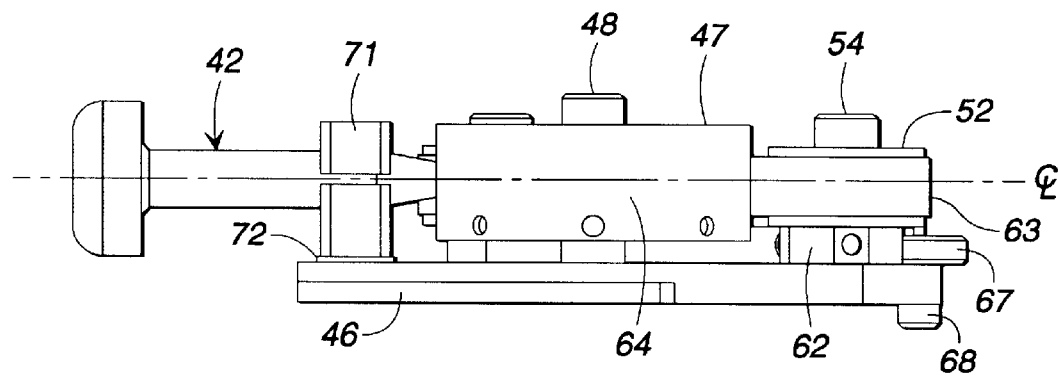
FIG. 5
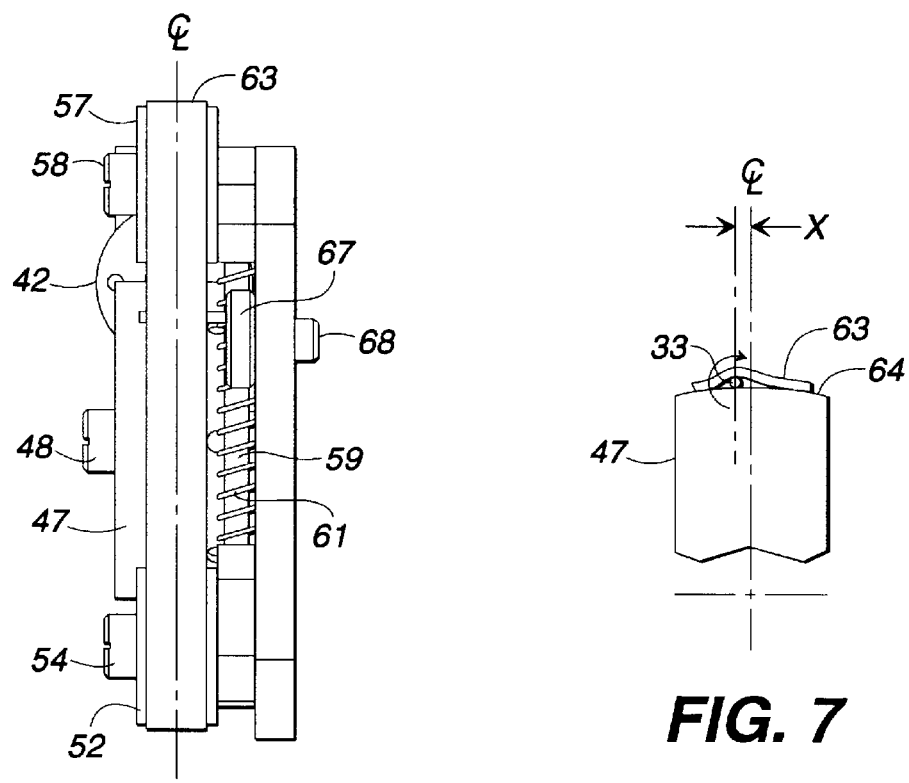
FIG. 6
FIG. 7

OPTICAL FIBER OVER THE END PAYOFF SYSTEM

FIELD OF INVENTION

This invention relates to the production of optical fiber ribbons and bundles (Lightpack®) and, more particularly, to that portion of the production line commonly referred to as the buffering or extrusion line.

BACKGROUND OF THE INVENTION

Optical fibers possess signal transmission capabilities which vastly exceed those of metallic conductors and, as a consequence, the communications industry relies more and more on optical fibers for such transmissions. Despite the advantages to be realized with optical fibers, they possess inherent disadvantages which must be overcome in order for their full potential to be realized.

For example, optical fibers are quite brittle and can break if bent too sharply or are even subject to small elongations due to tensile stress. Furthermore, even where stresses are not sufficient to cause breakage, they can cause increases in optical attenuation. In addition, splicing individual fibers can present other problems leading to decreased transmission capability or increased signal loss. It is generally preferable to handle and splice fibers in groups rather than individually, and, as a consequence, they are often grouped together in the form of a bundle of fibers or disposed side by side in a matrix material to form a ribbon. Cabling can then comprise stacking a plurality of ribbons, as is shown in U.S. Pat. No. 4,129,469 of Knab, or combining several bundles into a larger bundle.

In U.S. Pat. No. 4,289,558 there is shown as arrangement for assembling a plurality of fibers into a ribbon configuration. A plurality of rotatable fiber spools, each containing an individual fiber wound thereon, supply fiber to a series of sheaves which orient the fibers pulled off of the rotating spools into a side by side configuration which then proceed through an alignment stage including one or more fiber organizers and then into a laminating apparatus where the matrix material is applied to form the multi-fiber ribbon. The ribbon is then wound on a take-up spool. Throughout the entire process, the fibers are maintained under tension which, among other things, causes the supply spools to rotate as the fiber is pulled therefrom. The use of rotating supply reels, especially when the fiber is pulled therefrom, has several disadvantages. First and perhaps foremost, is that the fiber is under tension, hence, careful monitoring of the tension is necessary to prevent fiber breakage. Secondly, it is necessary to have a braking or clutch arrangement to govern the speed of rotation of the supply spools, which can cause further possibly deleterious increases in tension on the fiber. Thirdly, tie-ins must be made at relatively slow speeds of rotation of the supply spools. A tie-in is simply when a second fiber is inserted into the extruder to continue the manufacturing process when the first fiber reaches its end. Also, slowing down the speed of rotation of the supply spools also requires a modification of the extruder to insure uniform application of, for example, the matrix material. Finally, the use of rotating spools prevents measuring the transmission characteristics of the fiber during pay-out.

To overcome the problems resulting from fiber tension and rotating supply spools, over-the-spool-end pay-out (OTE) has been used. In over-the-end pay-out, the supply spool is stationary and the fiber flies off of one end thereof, under near zero tension. As a consequence, the inertia of the spool is eliminated and no braking or clutching thereof is required, thus rapid start up and shut down of the fiber pay-out is made possible. In addition, the speed range is quite broad, from, for example, zero to twenty meters per second (0–20 m/sec). Inasmuch as the spool is non-rotating, the inside end of the fiber can be used for continuously testing the transmission characteristics of the fiber such as with an optical time domain reflectometer (OTDR) attached to the inside, non-moving, fiber end. There is virtually no pull-back tension on the spool, and rotating shafts and spindles are eliminated, materially contributing to the simplicity of the fiber pay-out system.

Despite these numerous advantages of the OTE pay-out, there is a problem inherent to the arrangement, and that is there exists a tendency to impart a twist to the fiber between the spool and the remainder of the system. This twist can accumulate to where the fiber can become badly tangled, even to the extent that the fiber might break or the system must be shut down to remove the tangle. It can be appreciated that where a large number of supply spools is involved, this can become an extremely serious problem.

The present invention is directed to the substantial, if not complete, nullification of this twist so that accumulation thereof and consequent fiber entanglement is eliminated.

SUMMARY OF THE INVENTION

The present invention comprises a means for passing the coated fiber emerging from the spool in over-the-end pay-out through a capstan and belt arrangement wherein the belt maintains the fiber in contact with the surface of the capstan. A means is provided for positioning the fiber on the surface of the capstan in a manner such that as the fiber and the sheave member or capstan move through at least a partial revolution of the sheave member, a twist is imparted to the fiber which counteracts the twist therein imparted by the OTE pay-out. As a consequence, the fiber between the supply spool and the capstan has virtually no twist and tangling is substantially completely eliminated.

In greater detail, the invention comprises, in a preferred embodiment thereof, a module located at a focal point of each supply spool. The module comprises a platform upon which a freely rotatable sheave member is mounted. First and second rotatable idler sheaves are mounted in fixed position on the platform, and a third idler sheave is mounted on the distal end of a movable arm, the proximal end of which is pivotally mounted to the axis of one of the idler sheaves. A flat endless belt is disposed about the idler sheaves in a manner such that it bears against at least a portion of the surface of the sheave member. The movable or pivotable arm is spring loaded so that it maintains sufficient belt tension to maintain, in turn, the belt in firm contact with the surface of the sheave member. Fiber from the supply spool is passed through a guide nozzle mounted in a stanchion which, in turn, is mounted on the platform adjacent the sheave member. The guide nozzle is positioned to guide the fiber onto the surface of the sheave member so that it is positioned between the surface of the sheave member and the surface of the belt which bears against that surface, and is maintained in contact with both the surface and the belt through at least a portion of their length.

In accordance with a feature of the invention, the height of the axis of the nozzle, and hence, the vertical position of its exit end relative to the surface of the sheave member, which is vertically oriented, is made adjustable by means for raising or lowering the stanchion relation to the base. The means for raising the stanchion, in its simplified form, comprises one or more shims, which afford a simple and quick means for achieving extremely accurate positioning of the height of the nozzle relative to the base, and hence, relative to the surface of the sheave means or capstan. Alternative means, such as, for example, a camming arrangement, might readily be used to move the stanchion or, alternatively, the nozzle may be mounted in the stanchion in such a manner that it might be moved up or down, as desired.

In operation, the fiber exiting the module is under tension from further apparatus downstream, and, hence, as the fiber is pulled through the module, the sheave member rotates and the belt also is caused to move. However, between the supply spool and the entrance to the module, i.e., the nozzle, there is very little tension inasmuch as the fiber pays out freely, and with no force such as a brake, from the spool. As was pointed out hereinbefore, the OTE pay-out imparts a twist to the fiber over this distance. It has been found that when the fiber on the surface of the sheave member is off center relative to the belt, the belt imparts a twist to the fiber which, depending upon how far off center the fiber is, effectively counteracts the twist in the fiber coming from the supply spool. As a consequence, when the degree of nozzle offset is correct, there is little or no twist in the fiber between the supply spool and the nozzle, and the threat or possibility of twist accumulation and consequent entanglement, is effectively eliminated.

An adjustable belt tensioner functions to insure that the belt, during operation, bears against the surface of the sheave member to insure proper interaction between the belt and the fiber.

These and other features and advantages of the present invention will be more readily apparent from the following detailed description, read in conjunction with the accompanying drawings.

DESCRIPTION OF THE DRAWINGS

FIG. 5 is a side elevation view of the module of FIG. 3;

FIG. 6 is another side elevation view of the module of FIG. 3; and

FIG. 7 is a diagrammatic view of a portion of the sheave member, the belt, and the fiber, illustrating the action of the belt and sheave member on the fiber.

DETAILED DESCRIPTION

Figure 1:
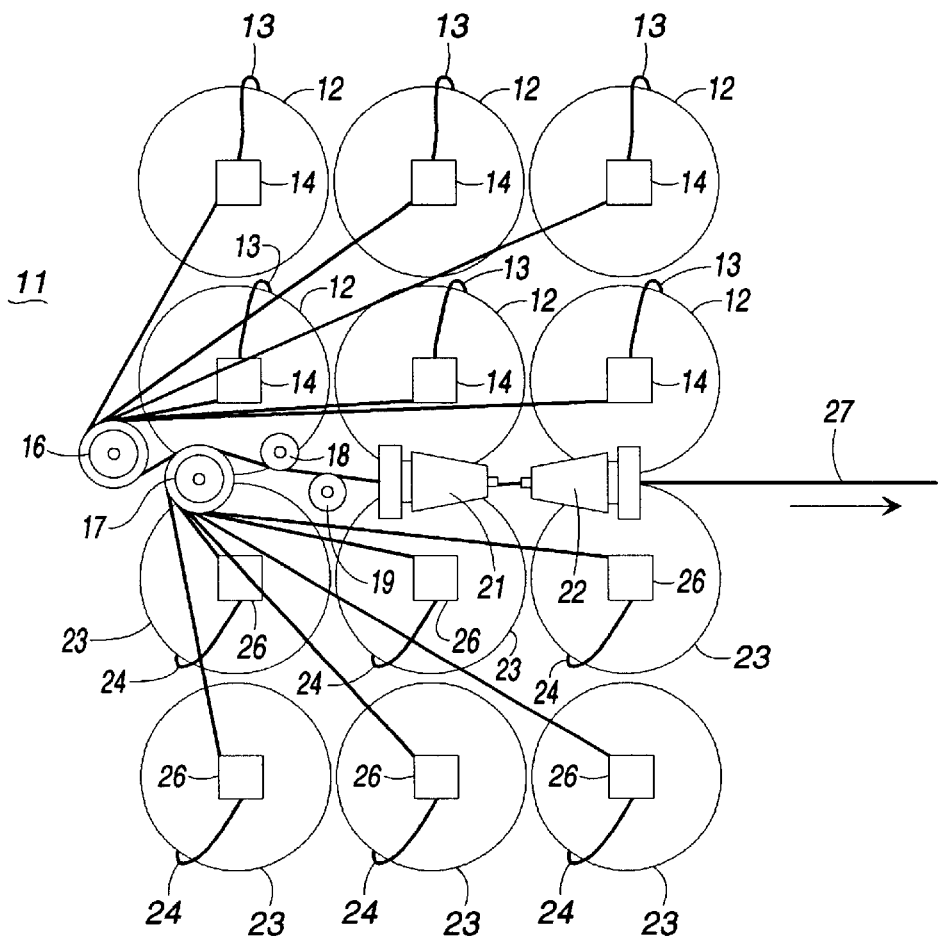
FIG. 1 is a diagrammatic view of an optical fiber bundling system.

The present invention is applicable to any of a number of different stages in a fiber optic cable production line, especially where the incorporation of coated fibers into the operation is necessary. In FIG. 1 there is shown, in diagrammatic form, a line stage wherein a plurality of coated fibers are bundled together and which utilizes the present invention. The stage 11 comprises a first group of six fiber supply spools 12 which supply over-the-end paid out fibers 13, each to an individual module 14. The fibers 13 exiting the modules 14 are passed over a first rotating or rotatable sheave 16 and a second sheave 17, over idler or special treatment (such as oiling) wheels 18 and 19, to the first stage 21 of a binder and there through the second stage 22 thereof. In like manner, a plurality of supply spools 23 supply, through OTE pay-out, fibers 24 to modules 26 and through them to sheave 17, wheels 18 and 19 and into binder members 21 and 22. All of the fibers 13 and 24 are bound together in binders 21 and 22 so that there emerges from binder 22 a plurality of fibers bound together in a bundle 27 which proceeds in the direction of the arrow to further processing stages.

The arrangement of FIG. 1 makes possible a rapid tie-in that is superior to many ways to present day practices. Prior to the use of OTE pay-out, production tie-ins had to be made at a fiber speed of approximately 100 feet per minute (FPM) because the rotating spools would not accelerate to a speed above that without inducing fiber breakage. With the rotating spool type pay-out, in, for example, an extrusion operation, the operator would mark the fiber exiting the extruder, slow the line down from 400 FPM to 100 FPM or less, make the tie in, cut out the fiber on the almost empty supply spool, and return the apparatus to production line speed. This procedure has several disadvantages, not the least of which is that buffered fiber scrap is being generated from the marking point until the take-up transfers onto a new fiber spool. The procedure necessitates, in the extrusion process, an oversized extrusion tube to accommodate two fibers, which can subsequently produce eccentricities in the normal fiber buffering process, for example. Further, as pointed out hereinbefore, reducing the line speed can cause extrusion instabilities. Virtually all of these disadvantages are overcome by OTE pay-out which has, as pointed out hereinbefore, the potential for fiber tangling. Thus, in the arrangement of FIG. 1, the modules 13 and 26 are added to obviate this undesirable result.

Figure 2:
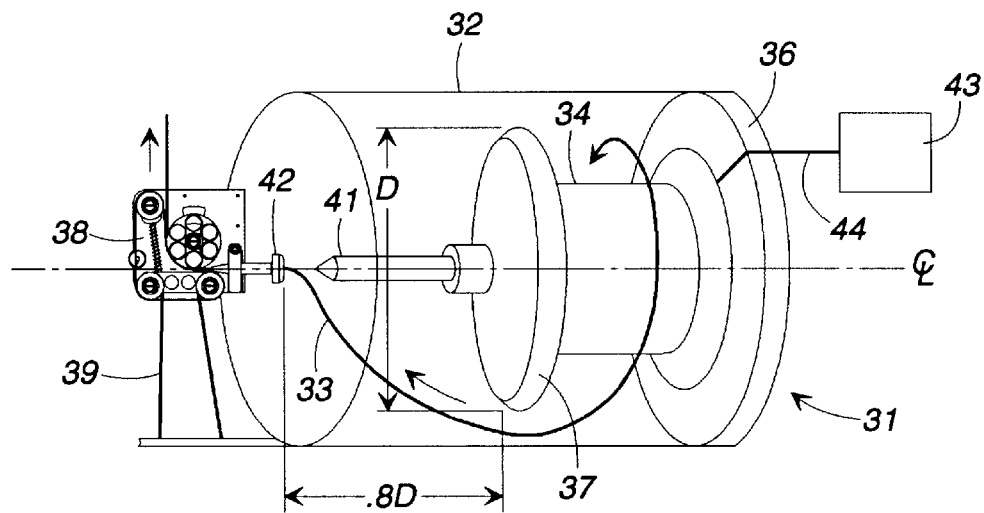
FIG. 2 is a perspective view showing, in partially diagrammatic form, the system of the present invention.

In FIG. 2 there is depicted a supply spool 31 housed in an open ended cylindrical member 32. The function of member 32 is to confine the fiber in OTE pay-out to prevent it from flying out and become entangled with adjacent fibers also being paid out or possibly with other equipment. Spool 31 comprises a hub 34 about which fiber 33 is wound and first and second end flanges 36 and 37. For facilitation of the OTE pay-out, the diameter D of flange or disc 37 is somewhat smaller than that of flange 36, and has rounded edges, as shown, to prevent the fiber 33 from being pulled over or otherwise contacting sharp edges or corners which might damage the fiber. Adjacent the open end of tube or cylindrical member 32 is a pay-out module 38 which is mounted by any suitable means 39 relative to the spool and tube assembly. Thus, module 38 can be mounted on the spindle 41 holding spool 31 or to the assembly (not shown) on which the spindle or spindles 41 are carried. Module 38 has an input nozzle 42 of suitable material, preferably having a ceramic base or coating, which is preferably located along the center line of the spindle 41 and hence the centerline of spool 31, and defines, in effect, a focal point for the fiber 33. In practice, it has been found that the focal point, i.e., the input to nozzle 42, should be at least 0.8D to prevent too sharp bending of fiber 33 as its enters nozzle 42.

One of the advantages of OTE pay-out is illustrated in FIG. 2 by a fiber testing member 43 attached to the stationary inner end 44 of the fiber 33 wound on spool hub 34. Inasmuch as spool 31 is stationary during the pay-out operation, inner end is likewise stationary, and continuous testing of, for example, the conductivity of fiber 33 by means of member 43 during the pay-out operation, is possible. Member 43 may be any of a number of testing devices, such as, for example, an optical time domain reflectometer (OTDR). However, one of the disadvantages of the OTE pay-out is, as discussed hereinbefore, the tendency of the pay-out to impart a twist to the fiber which, over a period of time, accumulates in effect so that the fiber becomes entangled with itself to the point where it may fail to feed properly to the following operational devices.

Figure 3:
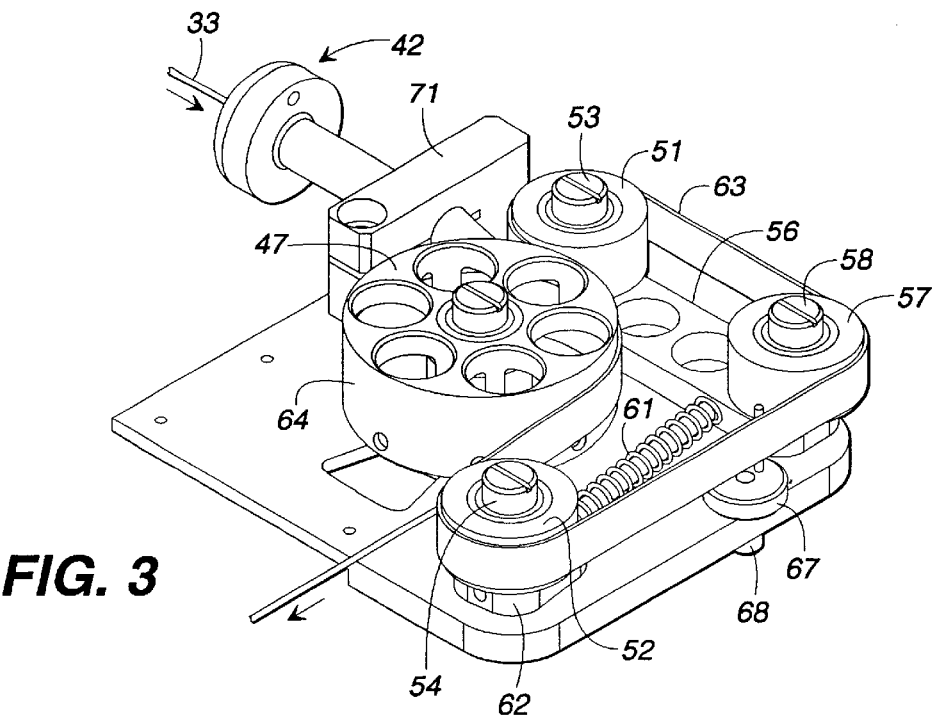
FIG. 3 is a perspective view of the fiber twist module of the present invention.
Figure 4:
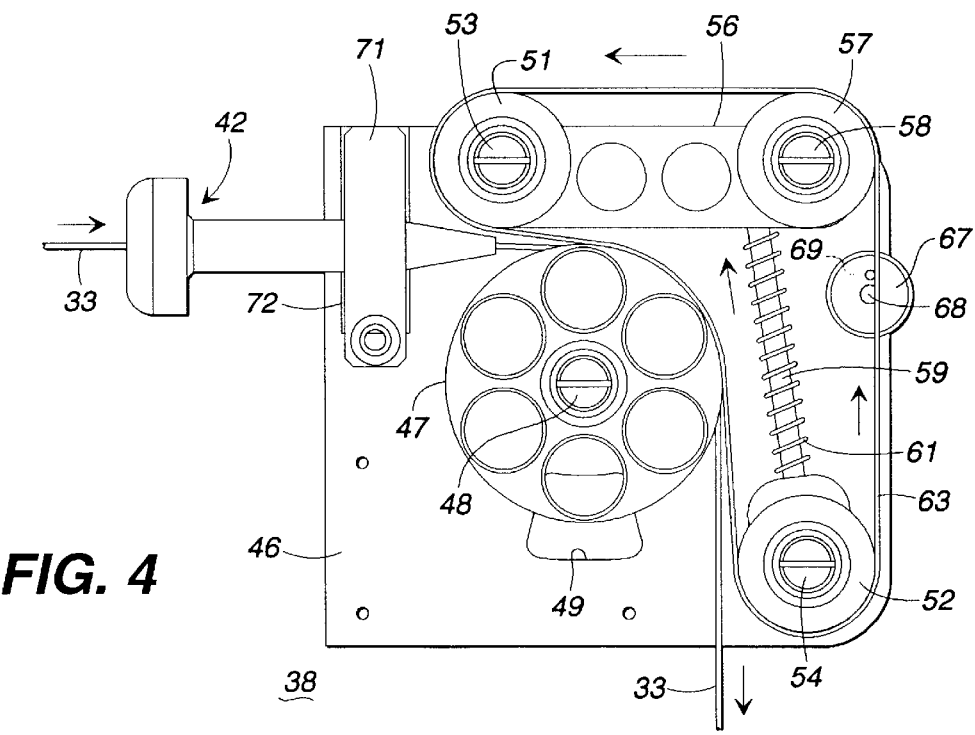
FIG. 4 is a plan view of the module of FIG. 3.

FIGS. 3 and 4 are a perspective and a plan view, respectively of the module 38 of FIG. 2, the principal function of which is to route the fiber 33 to subsequent operations in the production line while, at the same time, counteracting the twist imparted thereto by the OTE pay-out. In its preferred form, as depicted in FIGS. 3 through 6, module 58 comprises a base member 46 of suitable material such as, for example, aluminum, upon which is rotatably mounted a sheave member 47 by means of a shaft 48. Base member 46 has an adjusting slot 49 which allows proper positioning of shaft 48. Also rotatably mounted on base 46 are first and second idler wheels or sheaves 51 and 52 which, like sheave member 47, are freely rotatable on shafts 53 and 54 respectively. It will be readily apparent to one skilled in the art that shafts 48, 53, and 54 may be fixed and sheaves 47, 51, and 52 rotatable thereon, or they may be rotatably mounted to base 46 and sheaves 47, 51 and 52 affixed thereto.

Pivotally mounted on shaft 53 is an elongated arm 56, at the distal end of which is rotatably mounted an idler wheel or sheave 57 on a shaft 58. Sheave 57 is mounted to the freely rotatable with respect to arm 56 which is, in turn, freely pivotable with respect to shaft 53. A rod 59 having a biasing spring 61 thereon extends from shaft 54, about which it is retained by suitable means 62, to arm 56, against which the end of spring 61 bears. Thus, spring 61 applies a biasing force in the direction of the arrow to arm 56, and hence, to sheave or wheel 57.

An endless belt 63 of a material, such as urethane, is wound about the several sheaves 47, 51, 52, and 57 and spring 61 functions to tension the belt so that it bears against the surface 64 of sheave 47 over a portion of its circumference and defining a centerline of contact therewith, as shown in FIG. 5. Over this portion of contact between the surface 64 and the belt 63, the belt and sheave move together. Over a period of time or of extended usage, belt 63 may tend to develop a certain amount of slack through aging. To compensate for this, an auxiliary belt tensioner 66 is provided which comprises an adjusting wheel 67 mounted on a shaft 68 in base 46, and a tensioning pin 69 spaced from shaft 68. Thus, as wheel 67 is rotated, pin 69 bears against belt 63 forcing it slightly outward, thereby insuring that it bears against surface 64 even as it ages. Wheel 67 is mounted such that it does not slip, hence, despite the forces that may be exerted on pin 69, by belt 63, it does not change position, thereby maintaining the tension on belt 63. Pin 69 generates, in effect, a back tension on belt 63 as a result of rubbing thereagainst which functions as a braking arrangement to prevent belt runaway.

The fiber 33 from the OTE pay-out from spool 34 of FIG. 2 is routed to that portion of the surface 64 of sheave 47 with which belt 63 is in contact by means of nozzle 42. Nozzle 42 is mounted in a stanchion 71 adjacent sheave member 47, so that nozzle 42 is positioned to direct the fiber 33 as shown in particular in FIG. 4. In accordance with a feature of the invention, the height of stanchion 71 and hence of nozzle 42 is adjustable by suitable means 72, shown in FIG. 4 as shims, but which can take any of a number of forms such as a cam, a wedge, or wedges, or more sophisticated screw type adjustments. It can be appreciated that moving the exit end of nozzle 42 up or down vertically moves the position of the fiber 33 relative to belt 63 and surface 64. In FIG. 7 there is depicted to result of having the fiber pass through sheave member and belt contact portion in an off-center position. In FIG. 7 the surface 64 is shown as being slightly convex, which is a known means for insuring that the belt strap is centered on the surface 64 of sheave member 47. Fiber 33 is shown as being off-center by a distance X. In such a configuration, the belt 63 imparts a twist of fiber 33 as shown by the arrow, with the amount of displacement X determining, within limits, the amount of twist. As a consequence, when the fiber 33 is offset from the centerline in the proper direction and by the proper amount, the twist in the fiber imparted by the OTE pay-out is effectively nullified and the tendency of such twisted fiber to become untangled is obviated. In practice, it has been found that where the offset X from the center is in the range of approximately forty to fifty thousandths of an inch (0.040"–0.050"), the OTE imparted twist is substantially nullified or canceled. In the apparatus of FIGS. 4 through 7, the stanchion without shims or other elevation means places the exit end of the nozzle 42 in a position where the fiber is directed on to the surface 64 of the sheave member 47 approximately forty to fifty thousandths of an inch (0.040"–0.050") below the centerline of surface 64 and belt contact, thereby offsetting the fiber by that amount from the centerline. Depending the OTE layout, which is determined by the winding direction of the fiber on the supply spool 34, this offset may be adequate to nullify the OTE twist. On the other hand, it may be necessary to raise the nozzle end to place the fiber on the other side of the center line, hence the means 72 must raise the stanchion by twice the desired offset. Thus, if 0.040 inch offset is required on the other side of the center line, the means 72 should raise the nozzle the original offset distance plus an additional 0.040 inch. For example, if the stanchion originally locates the nozzle 0.040" below the centerline, then the means 72 should rise the stanchion approximately 0.080 inch. In general, it has been found that a value of X that is four or five times the fiber diameter produces the desired result, although for different speeds of OTE payout and different fiber diameters, the range can be from, for example, two to six or even less or more.

The fiber 33 emerging from module 38 will have a twist that is imparted by the module itself, as explained hereinbefore. However, this twist has little deleterious effect inasmuch as the fiber is under tension from the module on. On the other hand, looking back from the module to the supply spool, there is virtually no twist The invention, therefore, makes feasible the use of OTE pay-out at production line speeds which are, usually, in the two hundred to four hundred feet per minute (200–400 FPM) range, without the necessity of slowing or stopping the line to clear entanglement.

In concluding the detailed description, it should be noted that it will be obvious to those skilled in the art that many variations and modifications may be made to the preferred embodiment without departure from the principles and spirit of the present invention. All such variations and modifications are intended to be included herein as being within the scope of the present invention as set forth. Further, in the claims hereinafter, the corresponding structures, materials, acts and equivalents of all means or step plus function elements are intended to include any structure, material, or acts for performing the functions in combination with other claimed elements as specifically claimed.

What is claimed is:

1. An optical fiber pay-out system comprising:
   a stationary optical fiber storage spool;
   a module member for receiving optical fiber paid out over an end of said storage spool wherein the end pay-out imparts a twist to the fiber; and said module member having means for imparting a counteracting twist to the fiber for substantially nullifying the effect of the twist imparted to the fiber by the over-the-end pay-out thereof, said means comprising a rotating member having a fixed axis of rotation and having a circumferential surface and means for maintaining the fiber in contact with said surface.

2. An optical fiber pay-out system as claimed in claim 1 wherein said spool has a pay-out disk and said module is positioned a predetermined distance from said disk.

3. An optical fiber pay-out system as claimed in claim 2 wherein said pay-out disk has a diameter D and said predetermined distance is at least 0.80 inch.

4. An optical fiber pay-out system comprising:

a stationary optical fiber storage spool;

a module member for receiving optical fiber paid out over an end of said storage spool wherein the end pay-out imparts a twist to the fiber;

said module member comprising a rotatable capstan having a circumferential surface having said edges and a centerline equidistant from said edges and a movable belt member in contact with said surface thereof over at least a portion of said capstan's circumferential surface;

said module having means including said capstan and said belt for imparting a twist of the fiber for counteracting the twist imparted by the end pay-out of the fiber from said spool; and said means for imparting a twist further comprising means for positioning the fiber paid out from said spool between said capstan and said belt in an offset location relative to the centerline of said circumferential surface.

5. An optical fiber pay-out system as claimed in claim 4 wherein said means for positioning the fiber comprises a nozzle through which the fiber from the storage spool passes, said nozzle having an exit end adjacent the portion of said circumferential surface in contact with said belt member.

6. An optical fiber pay-out system as claimed in claim 5 wherein said means for imparting a twist to the fiber further comprises means for positioning said exit end of said nozzle to direct the fiber into contact with said capstan at a point removed from the centerline of said surface.

7. For use in an optical fiber pay-out system, a module for imparting a twist to the fiber comprising:

a base member, a capstan having a circumferential surface rotatably mounted on said base member;

means on said base member for supporting a movable belt, said means positioning said belt to contact said circumferential surface over a portion thereof whereby said belt has a centerline of contact therewith; and directing means on said base member for directing optical fiber between said circumferential surface and said belt in the portion where said belt and said surface are in contact, said directing means including means for directing the fiber to a position on said circumferential surface portion removed from the centerline of contact with said belt.

8. The module as claimed in claim 7 wherein said means for supporting said movable belt comprises first, second, and third sheaves, freely movable on shaft members, over which said belt passes.

9. The module as claimed in claim 8 wherein said second sheave is mounted on the distal end of a movable arm, said arm having its proximal end pivotally mounted to the shaft of said first sheave.

10. The module as claimed in claim 9 and further including biasing means for maintaining said belt in contact with said capstan.

11. The module as claimed in claim 10 wherein said biasing means comprises a spring member bearing against said arm adjacent the distal end thereof.

12. The module as claimed in claim 7 and further comprising belt tensioning mounted on said base member.

13. The module as claimed in claim 12 wherein said belt tensioning means comprises a pin positioned to bear against said belt and means for adjusting the force with which said pin bears against said belt.

14. The module as claimed in claim 7 wherein said directing means comprises a nozzle through which the fiber passes and having an exit end adjacent the portion where said circumferential surface and said belt are in contact.

15. The module as claimed in claim 14 wherein said means for directing the fiber to a position removed from the centerline of contact comprises a support member for said nozzle, and means for moving said nozzle vertically relative to said base member.

16. The module as claimed in claim 15 wherein said means for moving said nozzle comprises means for moving said support member vertically relative to said base member.

17. The module as claimed in claim 16 wherein said means for moving said support member comprises one or more shims.

18. The module as claimed in claim 7 wherein said position on said circumferential portion is removed from the centerline a distance equal to from two to six times the fiber diameter from the centerline.

* * * * *